Feb. 27, 1951 A. D. McGREGOR ET AL 2,543,295

UNITARY LOAD TRANSFER DEVICE

Filed Nov. 8, 1946 10 Sheets-Sheet 1

INVENTORS
A. D. McGREGOR
J. L. GROPP
By: Fetherstonhaugh & Co.
ATT'YS

UNITARY LOAD TRANSFER DEVICE

Filed Nov. 8, 1946 10 Sheets-Sheet 2

INVENTORS
A. D. McGREGOR
J. L. GROPP
By: Fetherstonhaugh & Co.
ATT'YS

INVENTORS
A. D. McGREGOR
J. L. GROPP
By: Fetherstonhaugh & Co.
ATT'YS

UNITARY LOAD TRANSFER DEVICE

Filed Nov. 8, 1946 10 Sheets-Sheet 4

INVENTORS
A. D. McGREGOR
J. L. GROPP
By: Fetherstonhaugh & Co.
ATT'YS

UNITARY LOAD TRANSFER DEVICE

Filed Nov. 8, 1946 10 Sheets-Sheet 5

INVENTORS
A. D. McGREGOR
J. L. GROPP
By: Fetherstonhaugh & Co.
ATT'YS

INVENTORS
A. D. McGREGOR
J. L. GROPP
By: Fetherstonhaugh & Co.
ATTYS

INVENTORS
A. D. McGREGOR
J. L. GROPP
By: Fetherstonhaugh & Co.
ATT'YS

Feb. 27, 1951 A. D. McGREGOR ET AL 2,543,295

UNITARY LOAD TRANSFER DEVICE

Filed Nov. 8, 1946 10 Sheets-Sheet 8

INVENTORS
A. D. McGREGOR
J. L. GROPP
By: Fetherstonhaugh & Co.
ATT'YS

Feb. 27, 1951 A. D. McGREGOR ET AL 2,543,295

UNITARY LOAD TRANSFER DEVICE

Filed Nov. 8, 1946 10 Sheets-Sheet 9

INVENTORS
A. D. McGREGOR
J. L. GROPP
By: Fetherstonhaugh & Co.
ATT'YS

Feb. 27, 1951 A. D. McGREGOR ET AL 2,543,295

UNITARY LOAD TRANSFER DEVICE

Filed Nov. 8, 1946 10 Sheets-Sheet 10

INVENTORS
A. D. McGREGOR
J. L. GROPP
By: Fetherstonhaugh & Co.
ATT'YS

Patented Feb. 27, 1951

2,543,295

UNITED STATES PATENT OFFICE 2,543,295

UNITARY LOAD TRANSFER DEVICE

Alexander Dobbie McGregor, Toronto, Ontario, and John Lowery Gropp, Hamilton, Ontario, Canada Application November 8, 1946, Serial No. 708,780

7 Claims. (Cl. 214—38)

This invention relates to load transferring systems for facilitating the transfer of haulage loads normally classed as freight.

Freight pick-up and delivery services operating in conjunction and co-operation with railway companies, steamship companies, motor transport companies, and the like, require the operation of trucks for city pick up and delivery of less than carload or less than truckload shipments. The units of freight involved must be transferred at the terminals of the companies to other vehicles for transportation and, subsequently, transferred to smaller vehicles for ultimate delivery. The loading and unloading staffs employed in such operations must be large and they experience periods of inactivity resulting in waste time while the delivery and pick up units are engaged away from the terminal. The present delay time in truck operation amounts to 25 to 30% of the working day of such equipment engaged in the distribution of mixed freight or for city or rural delivery of the manufacturer, to retail outlets.

We have undertaken an extensive study of the motor transport industry and have found that the average common carrier engaged in an inter-city haulage between large centres handles approximately 50% of his total tonnage direct from the shipper to consignee on the same vehicle without any handling charges whatsoever. Furthermore, the driver engaged in cross-country operations receives a higher rate of compensation than the city delivery driver and the employee engaged in loading and unloading. In spite of this situation, the percentage of labour costs to handle all freight from shipper to consignee on operations over a 250-mile radius approximates the following:

| | Per cent |
|---|---|
| Cross-country driver | 26 |
| City pick-up and delivery driver | 40 |
| Freight handlers | 34 |

When undertaking delivery operations to various plants the goods must be picked up on a smaller type truck which is adaptable for quick parking and maneuverability in restricted areas. The freight is normally transferred from smaller trucks over a platform at the terminal to a larger unit usually of semi-trailer type for transportation to the destination terminal. After the goods have arrived at the latter they are unloaded, sorted into routes within the city, and reloaded on to a smaller truck for ultimate delivery.

It is obvious, therefore, that larger companies require a loading staff over a 24-hour period and are subject to peak periods during the day and night, but these operations do not lend themselves to a shift work schedule of complete duration throughout the period. For example, on the early morning delivery, trucks may be inactive while the loading operations are in progress. On the other hand, the loading staff is inactive when the trucks are out with the delivery. This is repeated with the second delivery and again on the pick-up operations at night.

In order to cut down lost time and the labour waste, methods have formerly been proposed which have met the problem in some respects. However, it is submitted that former methods although taking advantage of a unit method of handling have not avoided the use of overhead cranes and other similar devices along with considerable manpower in order to move the unit load from the carrier to the place of deposit or vice versa.

It is, therefore, the prime object of the present invention to provide a method of handling loads of the class described involving the utilization of a substantially conventional truck body upon which a superstructure is built in the form of a slidable floor member designed to carry the load and hereinafter referred to as the body unit. At the point of destination, a movable trestle is set up which is slidable within a loading receiver and which is capable of extending outwardly therefrom. Suitable automatic lock means are supplied at relevant points on the various structures to effect an efficient transfer function so that as the truck backs up to the unloading receiver lock means engage ready to pull the trestle outwardly from within the receiver. At the same time, the body member disengages from the truck and is locked to the receiver such that as the truck moves forward the body and the unit load thereon are left sitting on the trestle after the trestle reaches a predetermined extension with respect to the receiver and supports the unit load.

Another object of the present invention is to provide a load transferring means as formerly described whereby motive power generally used in distribution of height is capable of reduction by substantially 25% and loading labour costs reduced by 40 to 50%.

A further object of the present invention is to provide a device as described which may be erected at railroad sidings or airports providing convenient trans-shipment with a minimum of handling and elimination of delays.

With these and other objects in view the present invention generally comprises a combination for transferring loads including a vehicle member, a slidable body member designed to accommodate the load, a receiver shown for purposes of illustration and hereinafter called a platform member, and a transferring agent hereinafter referred to as a trestle member. The function of transferring a unit load resting on the body member from the vehicle member to the trestle member or vice-versa is accomplished automatically through movement of the vehicle member in conjunction with locking means operative by such movement and mounted in conjunction with the said members.

Other objects of the present invention will be revealed by a study of the specification taken in conjunction with the accompanying drawings.

In the drawings:

Figures 1 to 7 demonstrate the method of transferring loads according to the present invention, showing a series of elevations of the equipment involved in various stages of operation.

Figure 10:
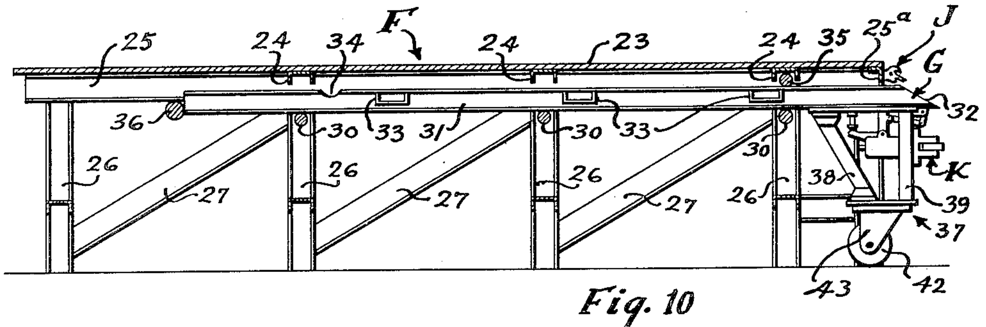
Figure 10 is a sectional view taken on the line 10—10 of Figure 11 revealing the structural nature of the trestle and platform.
Figure 14:
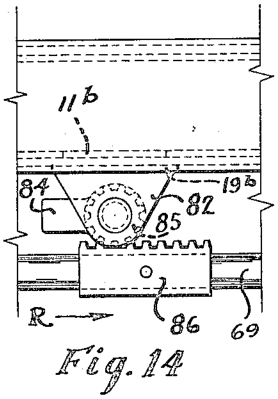

Figure 14 demonstrates the function of the gear relation revealed in co-operating parts 44 and 47 of Figure 10.

Figure 8:
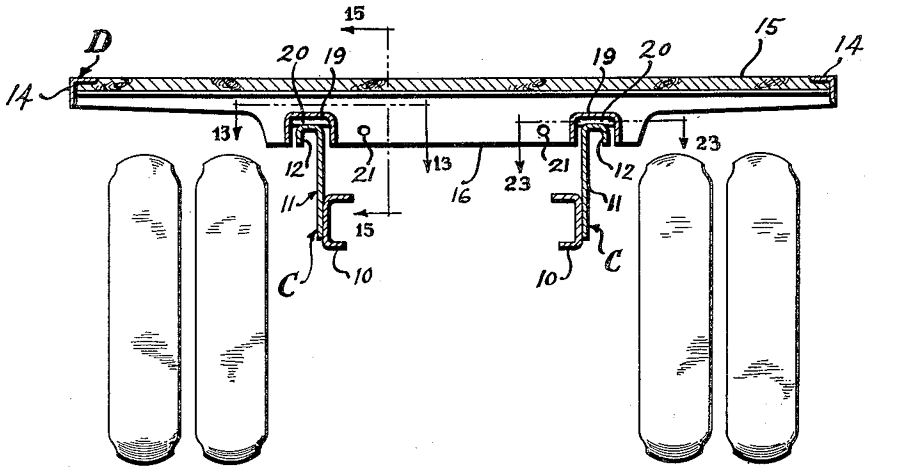
Figure 8 is a front sectional view of the movable truck body B and truck chassis A as illustrated in Figures 1 to 7, inclusive.
Figure 9:
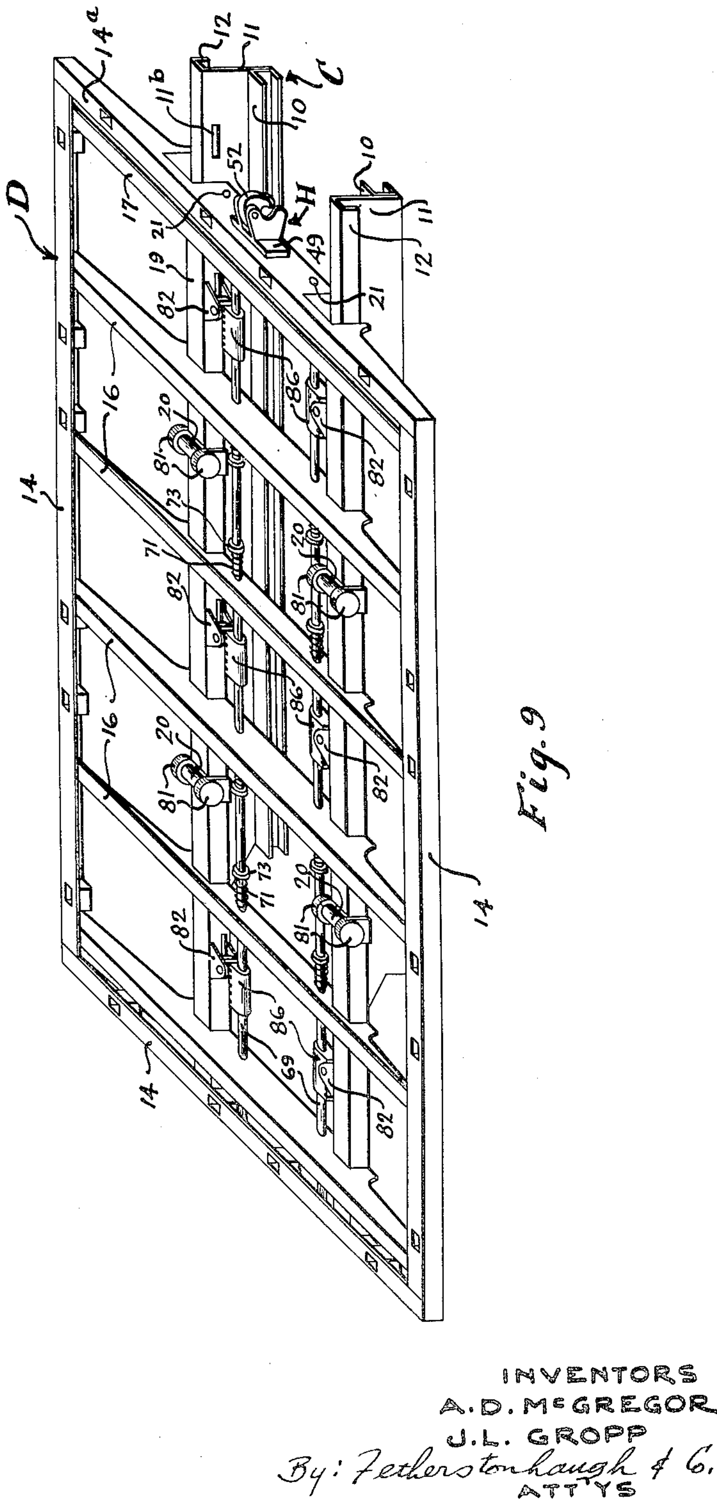
Figure 9 is an isometric projection of the body member D mounted on the chassis C of the vehicle of Figures 1 to 7.
Figure 13:
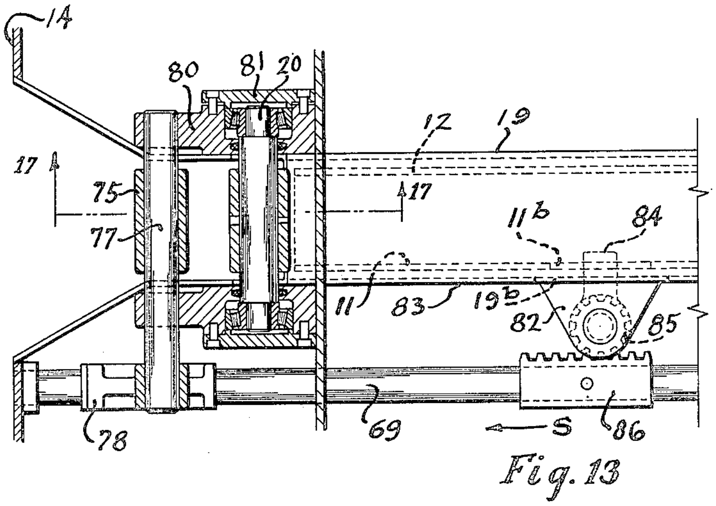
Figure 13 is a part sectional view taken on the line 13—13 as revealed in Figure 8.
Figure 15:
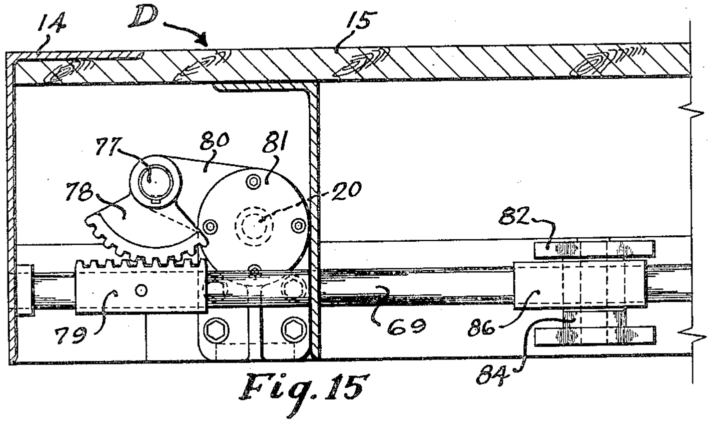

Figure 15 is an elevation of Figure 13 being the view 15—15 of Figure 8.

Figure 16:
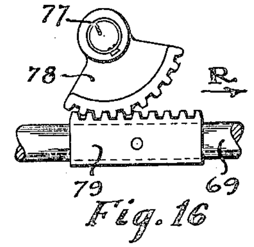

Figure 16 merely demonstrates the operation of the gear elements 78 and 79.

Figure 17:
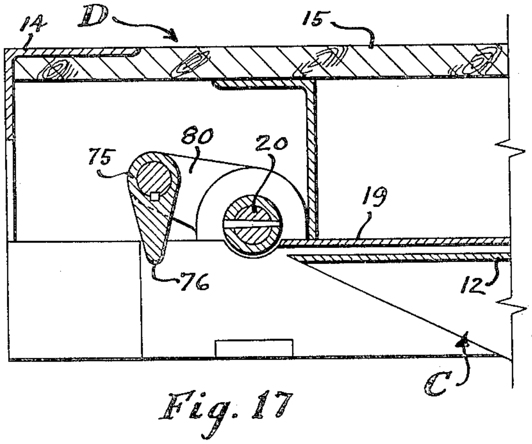

Figure 17 is a sectional view on the line 17—17 of Figure 13.

Figure 18:
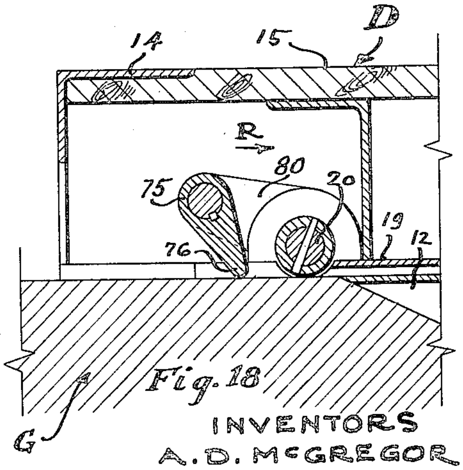

Figure 18 demonstrates operable movement of the trigger 75 related to the common shaft 77 of Figure 17.

Figure 19:
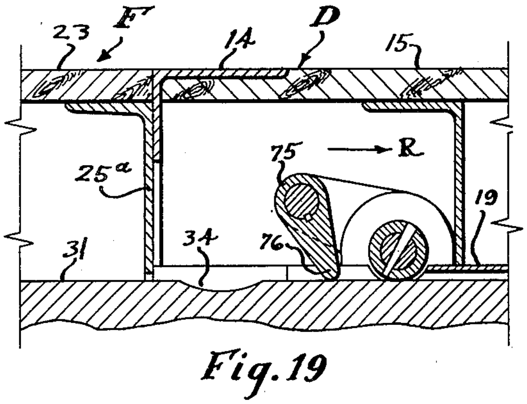

Figure 19 further demonstrates the operable movement of the trigger 75.

Figure 20:
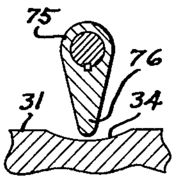
Figure 21:
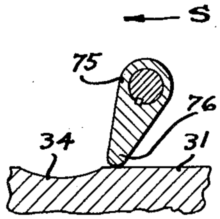

Figures 20 and 21 show various positions of the part 39 in different stages of operation.

Figure 12:
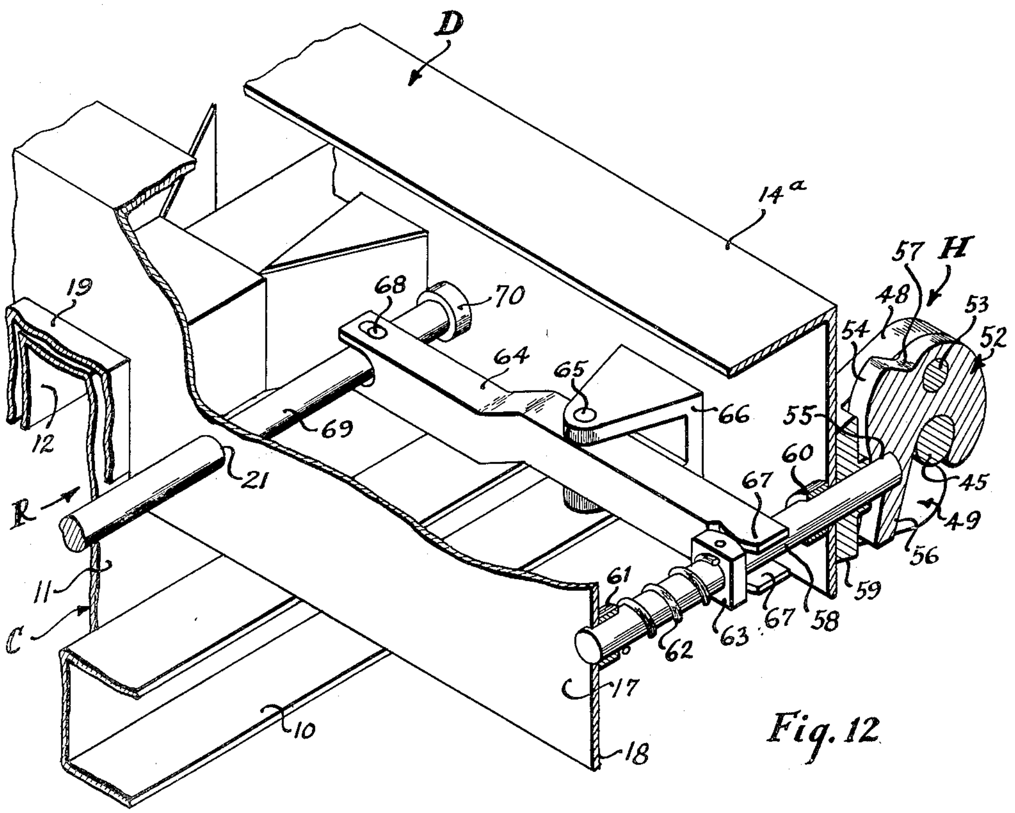
Figure 12 is a perspective view of the hitch locking mechanism H indicated in Figures 1 to 7, inclusive.
Figure 22:
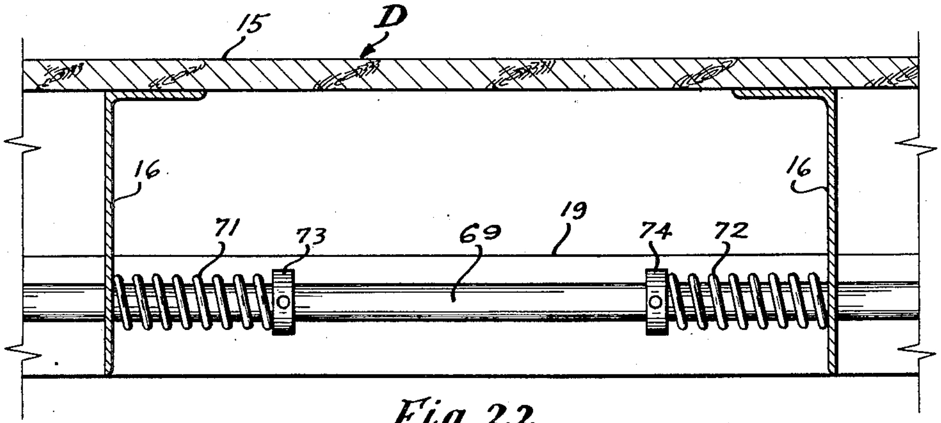

Figure 22 shows a continuation of the rod of Figure 12 towards the rear of the vehicle.

Figure 23:
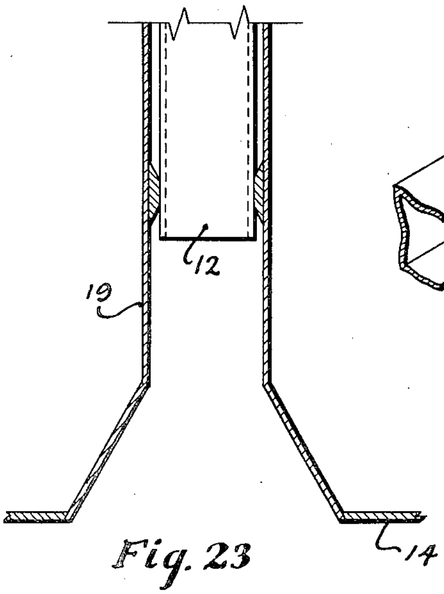

Figure 23 is a sectional view taken on the line 23—23 of Figure 8.

Figure 24:
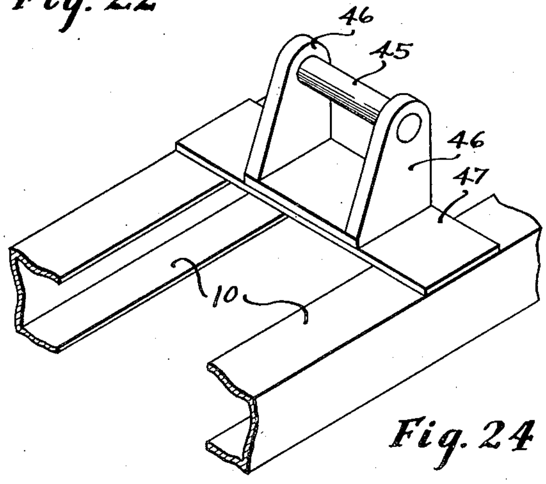

Figure 24 is an isometric view of the male portion of the front hitch locking mechanism H of Figures 1 to 7, inclusive.

Figures 25, 26:
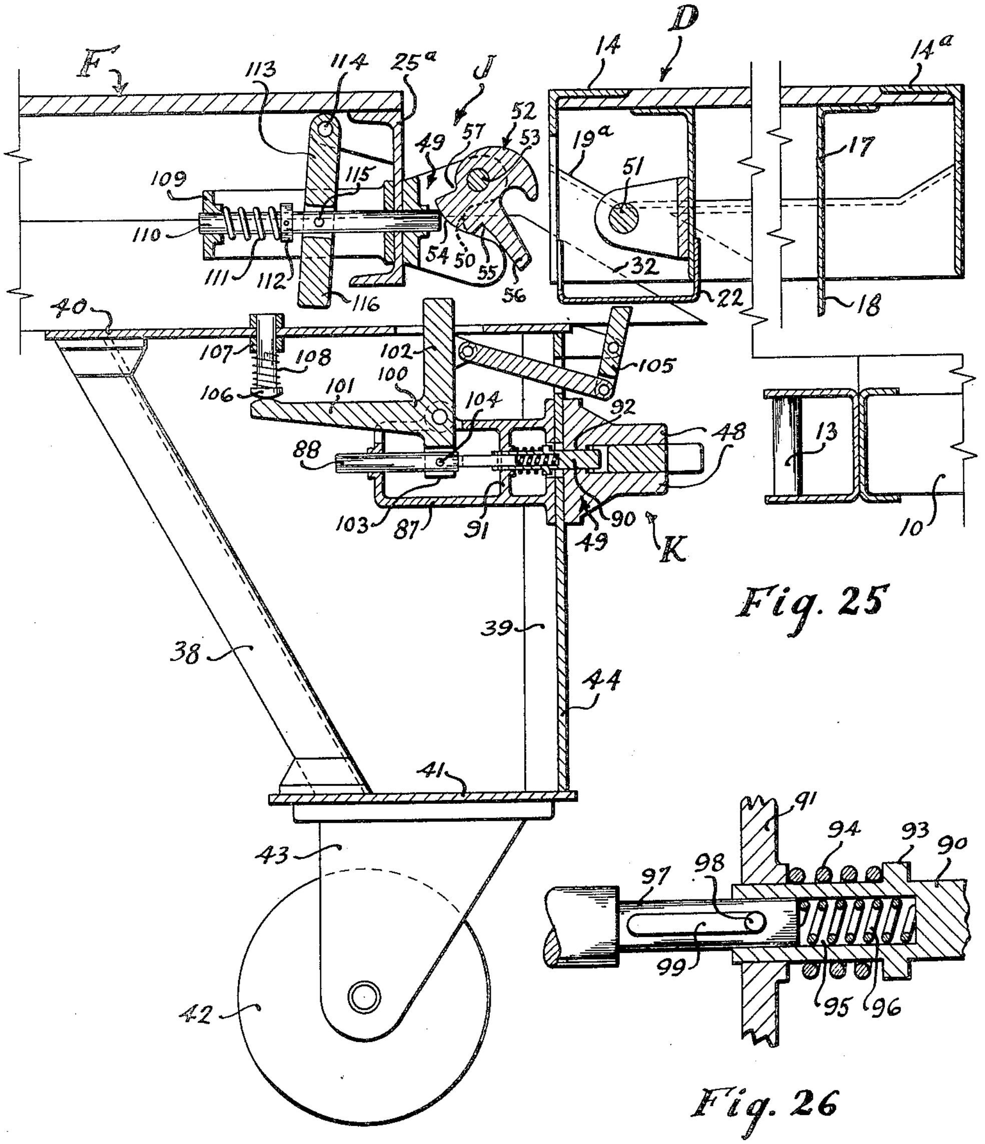

Figure 25 is a sectional view of the trestle locking hitch means K, and operating means relating thereto concerning the hitch operating mechanism J as indicated in Figures 1 to 7, inclusive.

Figure 26 is an enlarged sectional view of the parts of the trestle locking hitch means K according to Figures 1 to 7 and Figure 25.

Figures 27 to 30 inclusive are side elevational views of the system employed for the handling of movable truck bodies according to the present invention. In such case two movable bodies are mounted on a trailer chassis and transferring the same to a trestle.

Figure 31:
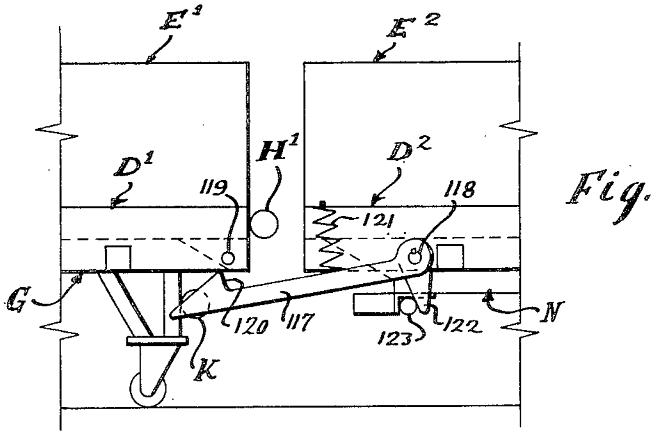

Figure 31 illustrates the coupling means used between the two movable bodies to form a complete trailer as indicated in Figures 27 to 30.

Figure 32:
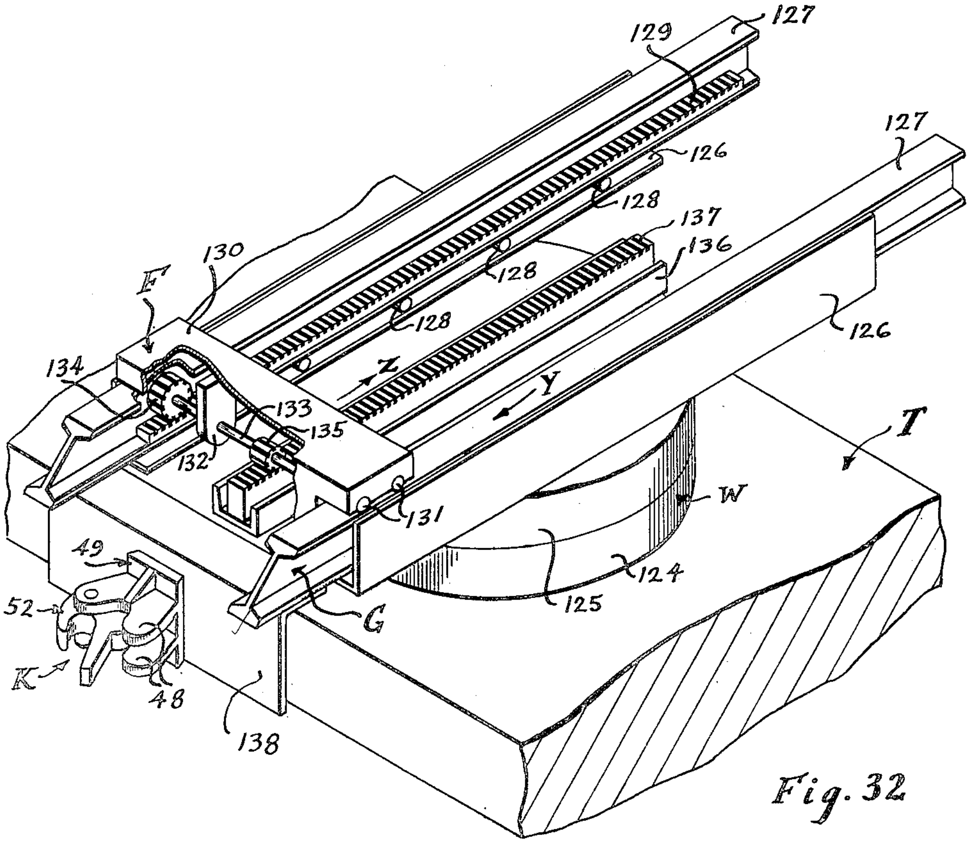

Figure 32 is a detailed perspective view of the type of loading platform I suitable for mounting on a conventional railway flat car utilized as indicated in Figures 35 to 38.

Figure 33:
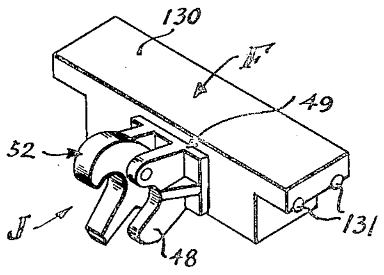
Figures 35, 36, 37, 38:
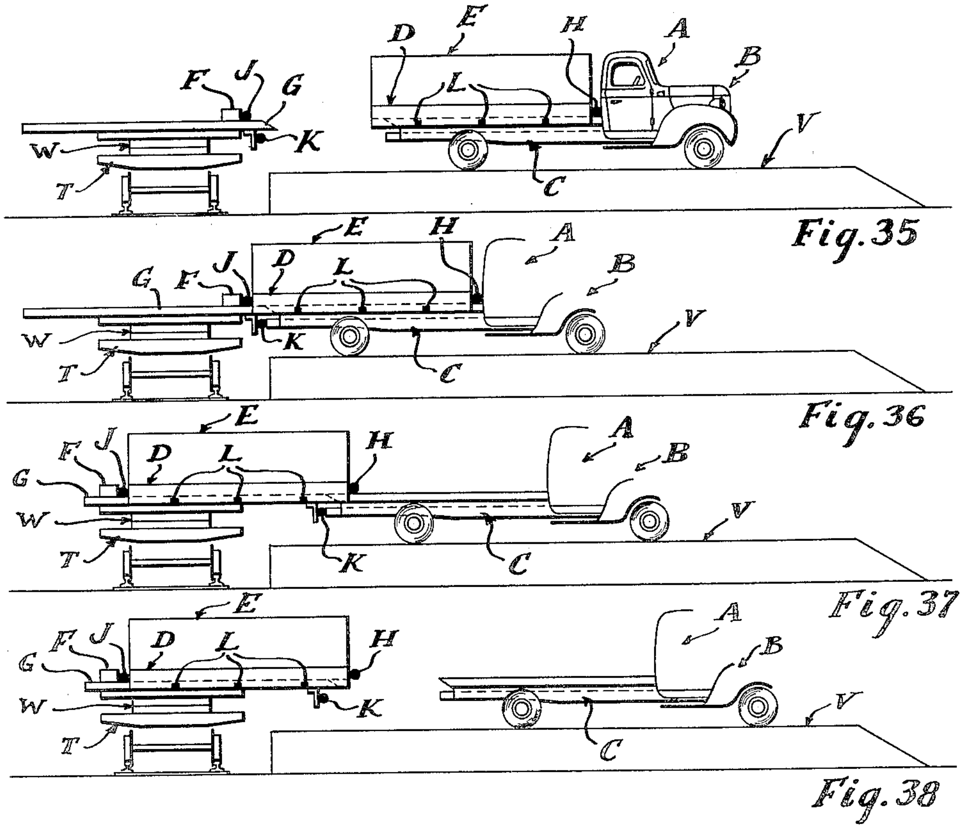

Figure 33 shows the lock hitching mechanism mounted on the hitching carriage 130 of Figure 32.

Figure 34:
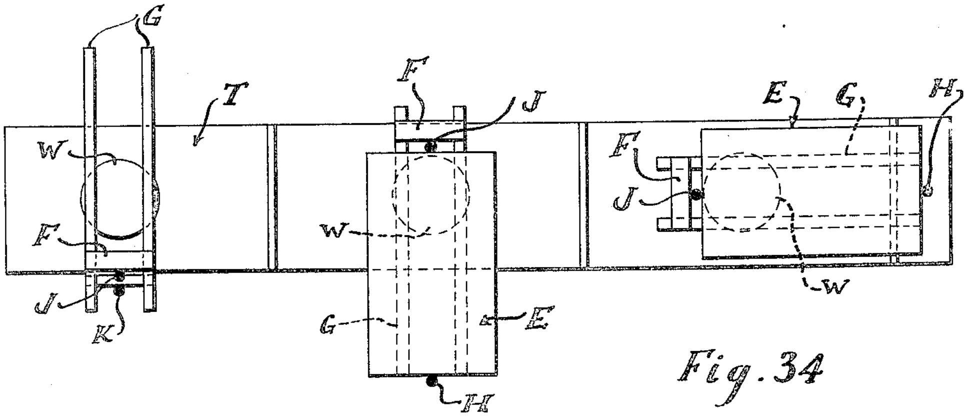

Figure 34 is a plan view of the flat car showing a series of platform units F as in the former figures.

Figures 35 to 38 inclusive illustrate the method of transferring a load from a truck to a railway flat car according to the present invention.

In the first instance the present invention involves a new principle and includes a method and relevant structures for the practical application of the same for the transferring of loads in freight handling operations. The principle employed relates to the utilization, not of three elements as formerly, that is a vehicle, a transferable load, and a platform to receive the load, but an extra member which acts as a transfering agent and called hereinafter a trestle, the same being related to the platform and slidable within the latter. Features attending the application of the principle concern the use of automatic means and slidable relation between the various members to effect the complete function automatically, thereby avoiding entirely the use of labour. In essence, therefore, the present invention takes advantage of the movement of the vehicle in unloading operations to operate the devices involved according to the present principle.

The principle involved is applicable to at least three cases which shall be outlined hereinafter. Thus, vehicles carrying a single unit load can be converted to use the present method of handling to great advantage. The invention, however, is not limited to small trucking operations and, therefore, the principle and relevant structures as applied to semi-trailers will also be outlined. The final case which will be described involves application of the method involving the present principle to unloading and loading operations with respect to railway flat cars and the like. A truck equipped according to the present invention will be capable of handling loads in conjunction with operation under the other cases. This is explained by suggesting that the unloading platform and trestle may be used either with the simple converted truck or the semi-trailer type as will be the case with the railway flat car trestle and unloading means.

Figures 1, 2, 3, 4, 5, 6, 7:
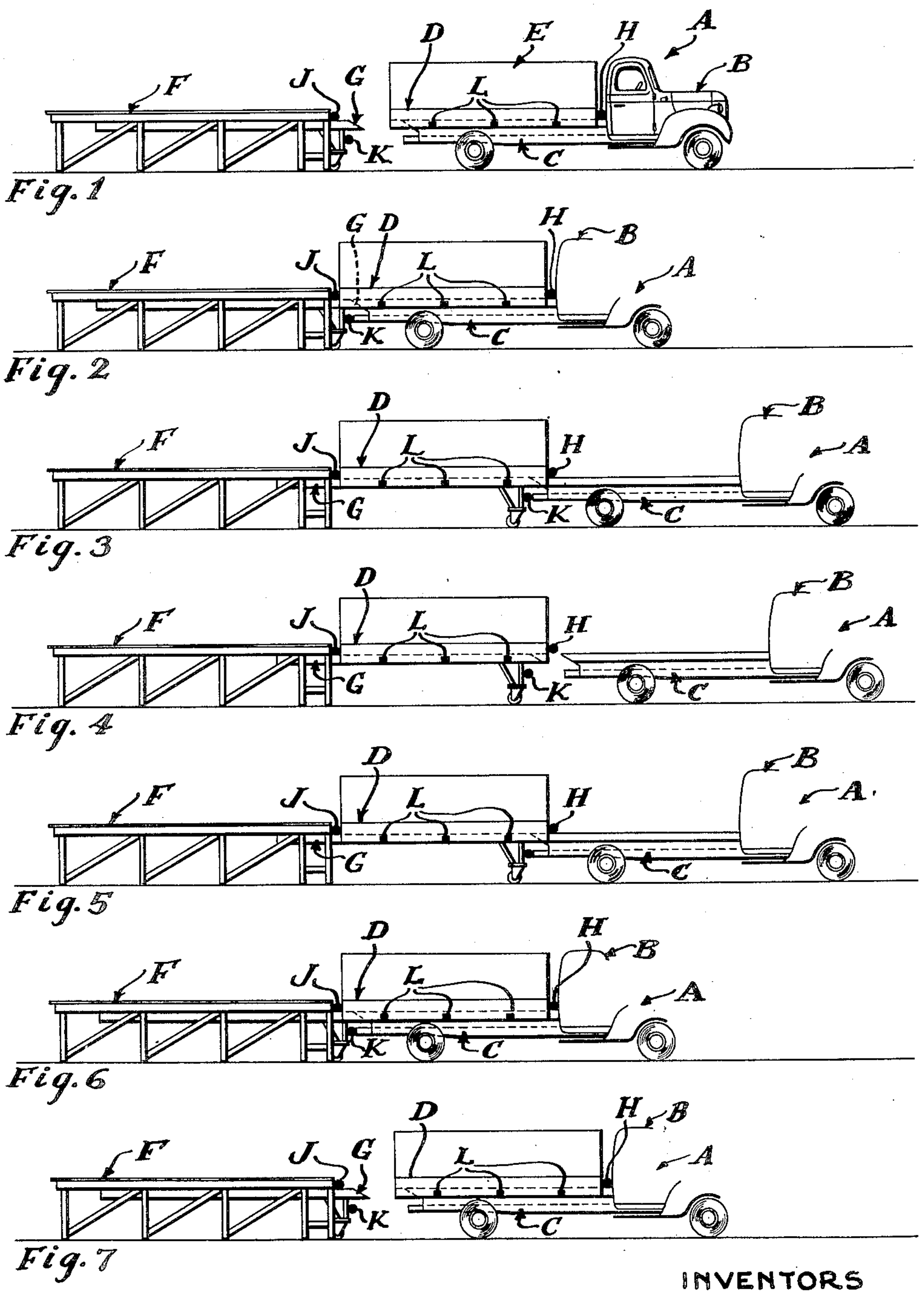

Referring to Figure 1 a conventional truck A is shown having a cab B mounted on a chassis C. A body member D carries a unit load E on the chassis as shown. A platform F carries a trestle G slidably within it, the trestle being that extra member relevant to the new principle adopted in the present invention as formerly described and hereinafter more fully set out. To facilitate the desired function, locking means H, J and K are shown and are used for locking the body member to the chassis C, the platform F to the body member D and the trestle G to the chassis C in a predetermined manner. Once the body member D is finally positioned with its load on either the chassis C or the trestle G, body locking means L are also utilized to hold the body fixed down to the relevant member.

Thus in Figure 1, the vehicle A is shown backing up to the platform F and trestle G. The locks H and L hold the body member and load firmly to the chassis C. As the truck engages the platform and trestle as in Figure 2 the locking means L and H are automatically disengaged and the locking hitches J and K engage and lock the platform F to the body member D, and the trestle G to the chassis C. The vehicle may, therefore, drive forward as indicated in Figure 3 pulling the trestle member G under the body member D until the trestle hits a stop (not shown) at the end of its travel in the body member D disengaging the locking means K and allowing the vehicle to proceed forward free of the load as in Figure 4. It must also be noted, however, that the locking means L fix the body member D to the trestle G as the latter arrives at the end of its travel and at the same time as the locking means K are disengaged.

The unloading operation described requires no handling whatsoever, being completely automatic and related only to the movement of the vehicle and not to interior mechanisms operated by the driver. The depositing of the load on the trestle enables workers to break down the unit load and deposit it on the platform F while the vehicle is away picking up another load. A great saving of time in unloading operations is, therefore, evident. But a further saving of time is effected with reference to loading operations as well.

Referring to Figure 4, a truck A is shown backing up to a trestle G carrying the body member D locked thereto by the body locking means L. The body member is also locked in this case to the platform F by the locking means J. As the vehicle meets the trestle, the trestle locking means K fix the former relative to the chassis C and the locking means L disengage unlocking the body D relative to the trestle G, The vehicle is, therefore, free to push the trestle within the platform F and transfer the load E on to the chassis C and as it reaches its backward limit of travel as in Figure 6 the locking means J lock the body member D to the chassis C and the locking means J and K disengage. Thus in Figure 7 the vehicle is free to move away from the platform and trestle, the load being held thereon by the locking means H and the body locking means L, the latter having been engaged when the vehicle met its backward extremity of travel as in Figure 6 and at the same time as the locking means J and K are disengaged.

Loading operations, therefore, are as simply carried out as unloading operations, involving only the normal operation of the vehicle in picking the load up from the trestle member. The trestle of course could be loaded during the absence of the vehicle, thus effecting a great saving of time in this as well as the former operations.

The conversion of a conventional vehicle in order to adapt it to the devices of the present invention may be simply undertaken with no great expense. Thus, referring to Figure 8, the longitudinal truck chassis member 10 has the track members 11 extending upwardly therefrom to form a U-shaped runner 12 extending the full length of the chassis. The only remaining addition concerns the mounting of a male locking member 13 (Figure 25) centrally of the rear end of the chassis being a cooperating part of the locking means K and the male locking member 45 of the locking means H (Figure 24).

The body member D is comprised of a perimeter frame comprised of the side and rear angle members 14 and the forward deep angle member 14*a* enclosing the flooring 15 being supported by a series of transverse angle members 16, all such members being similar with the exception of the foremost cross member 17 (Figure 25) which features a downwardly extending portion 18 used for triggering purposes to be later described. In all other respects, however, the cross members are substantially similar and carry longitudinally extending channels 19 which are designed to overlie the runners 12 of the chassis substantially in the manner shown. The body member D is slidable on the chassis C and to ensure freedom of movement in the axial direction of the runners 12 suitable rollers 20 are mounted in the channel members 19 at appropriate intervals throughout their length and engage the runners 12. The longitudinally extending channels 19 are flared (see Figures 12, 13, 23 and 25) at their extremities in an appropriate manner to allow ample tolerance in alignment when the body member D is being shifted from the chassis C to the trestle G. Holes 21 are located in each cross member to accommodate rod members (69) in connection with the various locking devices employed in the present invention. The only remaining feature relevant to the structural nature of the body member D is the transverse channel member 22 (Figure 25) which extends across the back end of the body member on the under side, acting not only as a reinforcing element at this point, but also as a triggering member for the trestle locking device K yet to be described.

Figure 11:
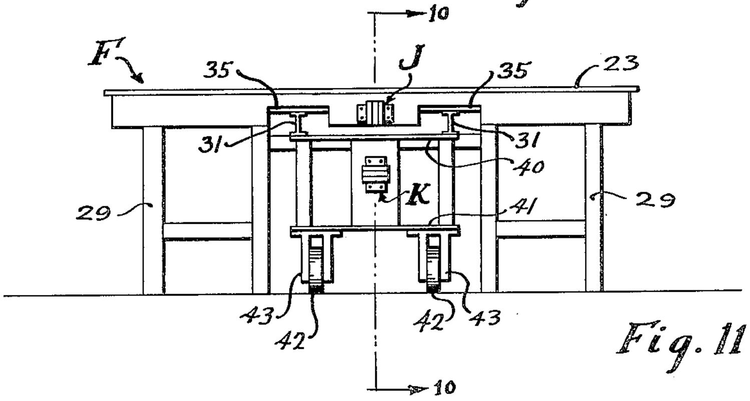
Figure 11 is a front elevation of the trestle G and platform F according to Figures 1 to 7 illustrating the lateral clearance between the trestle and platform structure to compensate for lateral misalignment.

Referring to Figures 10 and 11, the platform F is shown enclosing the trestle G. The structural nature of the platform is greatly variable according to the site chosen and other considerations, but one practical form as shown includes a suitable flooring 23 supported by spaced apart transverse channel members 24 and a number of longitudinal beams 25. This assembly is supported by a series of uprights 26, and diagonals 27, constituting a pair of spaced apart trusses 29. Transverse rollers 30 are mounted in the uprights to support the trestle G as it slides into the former.

The trestle comprises a pair of longitudinal beam members 31 having slope-cut ends as at 32 corresponding to the sloped flanged portion 19*a* of the longitudinal channels 19 of the body member D (Figure 25). Locking orifices 33 being the female portion of the locking means L, are formed in the longitudinal beam members 31 in the manner shown. A cleft 34 is cut in each beam 31 to form a trigger release means governing the locking means H and L hereinafter described. The upper roller 35 is mounted loosely in the forward transverse channel 24 of the platform and ensures smooth riding of the beam 31 in and out of the trestle, the backward limit of travel being determined by the stop bar 36 which is fixed to the longitudinal member 25. Referring to Figure 10 it will be observed that the beams 31 are supported on their fore portions by the carriage 37 which is built up of suitable angle members 38 and 39 extending between the plates 40 and 41, the latter plate carrying a pair of wheels 42 by the fork members 43, as shown in Figure 25.

A fore-plate member 44 carries the locking means K centrally of the structure as shown. The spacing of the trusses 29 allows a considerable amount of clearance with respect to the trestle G. Therefore only normal driving skill is required, on the part of the person operating a vehicle in conjunction with the present device.

*Locking means*

All locking devices of the present invention are located axially of the vehicle and platform, being intermediate of all running and supporting members. The front locking hitch H comprises in its male portion a rod 45 supported in a bracket member 46 and plate 47 mounted on the foremost extremity of the chassis 10 (Figure 24). The female portion of the front locking hitch H is best illustrated by Figure 12 and the similar hitch means of the Figure 25 relevant to the locking means J and K. Referring to these drawings, it will be observed that the bracket member 49 being a portion of the front locking hitch H is mounted centrally of the front lateral perimeter member 14*a* of the body member D. The bracket is in the form of two outwardly extending arms 48 which have contours undulating inwardly as at 50 to accommodate a male locking rod 45 or the rod 51 and 13 of the locking means J and K, respectively as the case may be. A locking hook 52 is mounted in the bracket 49 by the pin 53 extending through the arms 48, and a cam-like contour 54 is provided on the hook opposite the hooked end thereof terminating in a shoulder 55 adjacent the extending tongue portion 56. The hook 52 is cut back as at 57 to allow for clearance only, the shoulder so formed not having any function with respect to the operation of the hook. In order to hold the hook 52 about the rod 45 a locking rod 58 is provided which extends to the base 59 of the bracket 49 being mounted on suitable bushings 60 and 61 on the perimeter angle member 14*a* and the transverse member 17, respectively. To ensure a positive action of the locking rod 58, spring means 62 are mounted thereon engaging the bushing 61, being restricted by a stop member 63 fixed to the rod to provide positive thrust of the same. Normally, therefore, the locking rod 58 will forcefully engage the cam contour 54 of the hook member 52 and if the latter is enclosed about the rod member 45 as indicated in Figure 12, the locking rod will tightly engage the shoulder 55 to lock the hook in the locking position.

Actuation of the locking rod is provided by a lever arm 64 pivoted as at 65 on the bracket 66 and engaging the stop member 63 by the shoulders 67, having its other end mounted as at 68 to the longitudinal rod 69. The latter rod extends the complete length of the body member and passes through the supports 21 in the lateral members 16 and 17 as formerly described being slidable in the bushings 70 and 70*a* of the perimeter members 14 and 14*a*. Referring to Figure 22 it will be observed that the longitudinal member 69 is held in a neutral position by springs 71 and 72 engaging two of the transverse members 16 being inwardly held by the stop members 73 and 74, respectively. The rod 69 is shown in its neutral position in Figure 12 where it will be observed that a thrust of the rod in the direction R will cause disengagement of the locking rod 58 from the shoulder 55 of the hook 52.

Figures 13, 15, 17, 20 and 22 show the rod 69 and the position of actuating parts relevant thereto according to the neutral position of the rod. The position of the rod is determined by a trigger 75 which rides a trestle beam 31 or the runner 12 of the chassis C as the case may be by its terminal end 76. The trigger 75 is mounted on a shaft 77 which extends to mount the quadrant gear 78 engaging the travel gear 79 mounted on the rod 69. As in Figure 13, it will be observed that the trigger mechanism is mounted on a through channel 19 of the body member D substantially at the rear extremity thereof. The shaft 77 is mounted in the extended portion 80 of the housing 81 enclosing a roller 20 of the body member.

It is well to establish at this stage that counter-clockwise rotation of the trigger 75 results in movement of the rod 69 in the direction R causing disengagement of the locking rod 58 from the shoulder of locking hook 52 relevant to the locking means H. This function will only occur as the trestle member G is pulled under the body member D in which case the trestle beam 31 will cause counter-clockwise movement of the trigger 75.

With respect to the body locking means L it is relevant to note that a further rod 69 is mounted parallel to that formerly described and passing through another orifice 21 of the transverse member 16. There is no substantial difference between the two rods 69 with the exception that one governs the operation of the front locking means H by way of the lever arm 64. Both rods 69 govern the body locking means L which are mounted on each longitudinal channel member 19. Thus, referring to Figures 13 and 15, the locking means each comprise a U-shaped bracket member 82 preferably mounted on the inside face 83 of the longitudinal channels 19 and mounting a locking arm 84 designed to pass through an orifice 19*b* and 11*b*, of the member 19 and chassis member 11, respectively, or the orifice 19*b* and orifice 33 of the member 19 and trestle beam 31, respectively, depending on whether the body member B is being locked to the chassis C or trestle G. A sprocket gear 85 mounted co-operatively with the arm 84 engages the travel gear 86 fixed to a rod 69. When the rod 69 is in its neutral position the arm 84 extends inwardly to engage and lock the members 19 and 11 or 19 and 31 together. When the rod 69 moves in the direction R as formerly described, the arm 84 will be disengaged from the relevant orifices allowing free slidable movement of the roller 20 of the body member on the chassis or the trestle as revealed in Figure 14. It is important to realize, therefore, that the locking means L and H are related in that they will both be disengaged at the same time through actuation of the trigger 75 in a counter-clockwise direction. The locking means also being disengaged if the trigger 75 is rotated in a clockwise direction though in that case the shoulders 67 of the arm 64 do not bear against the stop member 63 on the actuation rod 58, to locking means H leaving full spring pressure to develop firm engagement of the locking rod with the contour 54 of the hook 52.

The trestle locking means K are similar to front locking means H with respect to the bracket 49 and hook 52, differing only in the means of actuation employed. The housing 87 is mounted co-operatively with the bracket member 49 but extends rearwardly of the plate 44 and mounts an actuating rod 88 in the end bushing 89. A compensating rod 90 is slidably mounted in the inner wall member 91 of the housing 87 and the bore 92 of the bracket member 49. The rod 90 has an annular shoulder 93 which cooperatively confines a spring 94 between the former and the inner wall 91 as shown in Figure 26. The compensating rod 90 has a bore 95 designed to accommodate a spring 96 and the extended portion 97 of the actuating rod 88. The extended portion 97 of the actuating rod is held within the bore 95 by a pin 98 the latter being slidable in a longitudinal slot 99 cut in the former substantially in the manner shown. A bell crank lever 100 is mounted on the housing 87 having outwardly extending arms 101, 102 and 103, the latter being pin connected to the actuating rod 88 as at 104. The arm 102 extends upwardly through the plate 40 to be engaged by the actuating plate 22 at the rear of the body member as it passes thereover in either direction. The lever 100 may be rotated in converse function by actuation of the trigger linkage 105 connected to the arm 102 by the lower extended portion 18 of the foremost cross member 17 of the body member D. The arm 101 of the bell crank engages a stud pin 106 at its free end, the latter being slidably mounted in the bushings 107 in the plate member 40 of the trestle. A weak spring 108 is provided to ensure against sticking of the pin in the upward extended position, the latter being relevant to the actuation of the platform locking means J.

The platform locking means J are similar to locking means H and K insofar as the locking device is concerned and differ again only slightly in the means of actuation employed. Thus, a housing 109 extends rearwardly from, but is mounted cooperatively with, the locking means J on the fore transverse member 25*a* of the platform. The locking rod 110 in this instance is very similar to the actuating rod 58 of the locking means H having a similar spring 111 and stop member 112. A swingable actuating arm 113 is pin mounted as at 114 and is slidable on a pin 115 extending from the locking rod 110 to its wall. The actuating arm 113 extends downwardly to form a trigger 116 designed to be engaged by the stud pin 106 when the latter is actuated by clockwise rotation of the bell crank lever 100. The locking means J cooperate with the male rod 51 to hold the body member D firmly with respect to the platform F as in Figure 3.

*Operation*

Operation of the basic form of the present invention is illustrated by considering a series of figures (1 to 7) each as a separate stage. Thus, referring to Figure 1 where a vehicle is backing up to unload a unit load E, the locking means L and H will be in the locking position. The locking arm 58 will be engaged in the shoulder 55 of the hook member 52, the locking shaft 45 thereby being firmly held within the lock. This will be so since the longitudinal rod 69 (Figure 12) will be in its neutral position. Therefore, the body lock L will be engaged as in Figure 13. The locks J and K will be in the open position similar to that illustrated by the platform lock J in Figure 25, the locking rod of each engaging the cam contour 54 of the relevant hook member 52. Referring to Figure 25, as the truck approaches the platform and trestle, the body member rides up on the sloped face 32 of the trestle member by the sloped face 19*a* of the channel member 19. On being engaged by the rods 51 and 13 the hook member 52 of the locks J and K will rotate about their pins 53 to enclose the male portions of the locks, at the same time spring pressure by way of springs 110 and 94 will cause the locking rods and compensating rod, respectively, to engage the shoulders 55 of the hook 52.

The locking means H and L disengage in the following manner: Referring to Figure 17, the trigger 75 is shown in its normal position, the locking means H and L being closed corresponding to Figure 1. As the body member partially rides up on the trestle G in the engagement of the locking means J and K, the trigger 75 is deflected counter-clockwise by engaging the upper surface of the beam member 31 of the trestle as in Figure 18 and, therefore, the rod 69 will be actuated in the direction R releasing the locking means as formerly described.

The body member D being locked to the platform, and the trestle being locked to the chassis of the truck, the vehicle may now proceed forward, drawing the trestle member G under the body member D as in Figure 3. Referring to Figure 25 it will be observed that the extended portion of the arm 102 will be engaged by the inverted cross channel member 22 of the body deflecting the former counter-clockwise. It is for this purpose that spring means 96 are placed in the compensating rod 90 to take up the lost motion. As the trestle member proceeds forward under the body member it will reach a predetermined extension from within the platform determined by the trigger arm 105 engaging the downward extended portion 18 of the transverse member 17. This same action will cause clockwise rotation of the bell crank lever 100 resulting in withdrawal of the compensating rod 90 from engagement with the hook member 52 of the trestle locking means K. Corresponding to this extension of the trestle from within the platform F under the body member D, a cleft 34 in each trestle rail 31 will be drawn opposite the trigger members 75 as in Figure 20, allowing the same to return to the normal position as shown. Therefore the body locking means L will engage as formerly described fixing the body member D to the trestle member G. The point remaining is observance of the fact that the locking means H, having formerly been disengaged, will now be held in the open position similar to the locking means J as demonstrated in Figure 24, the locking rod 58 engaging the shoulder 54 of the hook member 52. The locking means K having been unlocked as described, the vehicle may now drive away as in Figure 4 to pick up further loads.

In picking up loads from the trestle, operation is similarly dependent only upon the movement of the vehicle. Thus referring to Figure 5, the trestle locking means K having been left in the open position as formerly described, may readily engage and fix the chassis C to the trestle member G. Since the trigger 75 is disposed in the cleft 34 of the trestle member, the trestle member is not restrained from being pushed under the load by body member D and in such case the trigger member 75 will be deflected in a clockwise direction as in Figure 21 releasing the locking arms 64 of the lock L by moving the longitudinal rod 69 in the direction S as may be visualized with reference to Figure 13.

As the trestle member G approaches enclosure within the platform F, arm 102 of the bell crank lever 100 will be deflected clockwise by the inversed transverse channel member 22 on the rear of the body member D, at the same time withdrawing the compensating rod 90 from the trestle locking means K and pushing up the stud rod 106 through the bushings 107 to engage the actuating arm 116 thus releasing the locking rod 110 of the locking means J. The arm 102 of the bell crank lever 100 will continue to engage the inverse channel 22 (rod 51 is in jaws of lock J in this instance and not precisely as shown in Figure 25) and thus both locking means J and K will be released. At the same time however the front locking means H will engage and fix since the trigger is in the clockwise position or neutral (Figs. 20 and 21). The locking means H will engage and fix as soon as the vehicle pulls the body member away from the platform and trestle thereby allowing the trigger 75 to hang free and downwardly in the neutral position. The vehicle may therefore drive away with its load as in Figure 7.

*The method adapted to semi-trailers*

Figures 27 to 31 inclusive, illustrate a system for handing movable truck bodies embodying the present invention and illustrating the transfer of two movable truck bodies from a trailer chassis to two transfer agents known as trestles. As formerly, F indicates the platform and G the trestle having locking means J and K as shown. A tractor M is shown connected to a trailer chassis N, the latter supporting two slidable body members D1 and D2, locks H1 and H2, and L1 and L2 are also shown.

Figures 27, 28, 29, 30:
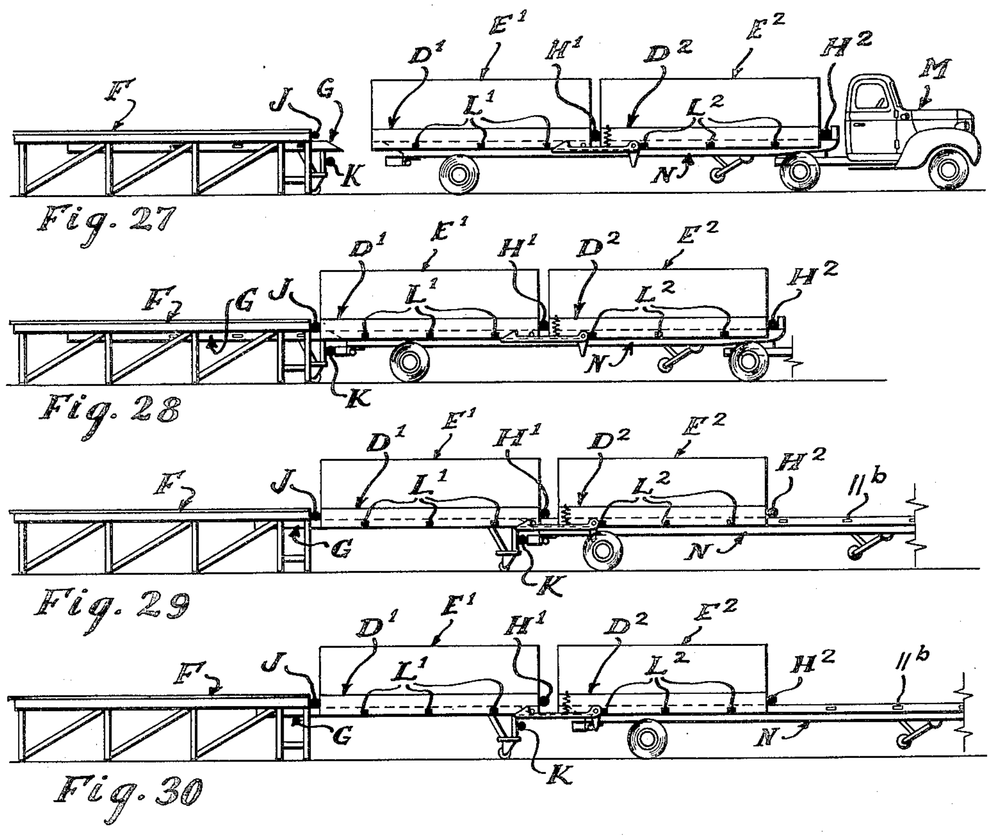

All devices concerning each element of the present construction are similar to those formerly described and require no further description, but note should be made of the fact that when the body members D1 and D2 are cooperatively joined as in Figure 27, the longitudinal rods 69 of each will butt against one another to translate motion from one body member to the other and actuate the relevant locking devices thereby. To facilitate the drawings of the two body members D1 and D2 along the semi-chassis N when the platform locking means J are engaging the body member D1, a locking arm 117 is employed.

Thus in Figure 31 an enlarged view of the locking arm 117 is shown revealing the arm as swingably mounted on the pin 118 and located thereby substantially axially of the body member D2. The other end of the arm 117 has an engaging face 120 designed to engage the stop rod 119 located in the lower portion of the body member D1 as shown. The arm 117 is held normally in the locking position by spring means 121 and the unlocking of the arm 117 from the rod 119 is accomplished through engagement of the trigger 122 with the stop member 123, the latter being mounted on the rear of the semi-chassis N substantially in the manner shown.

Operation under the semi-trailer system is illustrated by Figures 27 to 30, inclusive, where the unloading of a body element D1 from the trailer chassis N is set out in operational form. Thus, in Figure 27 the vehicle is shown backing towards the platform F and trestle G, the locks J and K engaging and locking the platform F to the body member D1 and the trestle G to the trailer chassis N (in Figure 28) as formerly described with reference to Figure 2. At this stage, the locking means H1, H2 and L1 and L2 will be disengaged as formerly described, the transference of motion from one body to the other being accomplished by the butt relation of the ends of the longitudinal rods 69 in each body. Therefore, the vehicle may move forward as in Figure 29 drawing the trestle member G beneath the body member D1 and causing the body member E2 to slide backwardly relative to the trailer chassis N. It will be observed that since the mounting means H1 have formerly been disengaged that the locking arm 117 comes into play at this stage and the engaging face 120 of the arm will engage the locking rod 119 even though the locking means H1 are completely free. As the trestle G reaches its maximum extension below the body member D1, the locking means K being automatically applied to the trestle chassis as before. The release of the locking element 117 from the locking rod 119, however, is accomplished by the bar 123 engaging the trigger 122 of the arm 117 resulting in counter-clockwise rotation of the latter and allowing the trailer chassis N and its load E2 to proceed free of the trestle member G and its load E1. This latter case is clearly illustrated in Figure 30.

Once the semi-chassis N and its load E2 are free of the trestle member G and the load E1, the trigger member 122 being engaged on the shaft 123 of the chassis N will prevent the body member D2 from proceeding further in a backward direction due to the restraint afforded by the spring 121 on the arm 117. Since the trigger 75 which governs the locking means L2 through the longitudinal rod 69 will no longer be engaging either the semi-trailer chassis N or the trestle member G it will assume the normal position and the locking means L2 will automatically be applied when the body member D2 reaches its normal position relative to the chassis N in respect of the appropriate location of the locking arm 84 and orifices 19*b* and 11*b*.

Further unloading operations may be carried out onto a further trestle member G and platform F as formerly described with respect to a unit load in Figures 1 to 4. It is suggested, therefore, that each body member made up should incorporate the added feature of the locking element 117 which would enable them to be used on semi-trailer operations. In this way the body members would be universal with respect to two types of vehicles which carry the great body of present transport loads on our highways.

*As applied to railways*

By altering the platform and trestle somewhat the present method may be applied to railway flat cars and the like. Thus, referring to Figures 32, 33 and 34, a railway flat car T in the latter figure is shown having three trestle members G mounted thereon by the pivot means W to allow the load E to be swung into alignment with the flat car T after placing it on the trestle G. The new trestle device involved is illustrated in Figures 32 and 33 and comprises a mount 124 which is secured to the flat car T and supports a slip ring member 125 which is free to revolve. Angle members 126 are parallelly disposed and secured to the slip ring 125 to support the trestle rails 127, free movement being accomplished by use of the rollers 128. Gear tooth racks 129 are secured to the trestle rails 127 on the inner face of the lower channel flange. A platform 130 is supported on the trestle rails 127 by the rollers 131 and carries brackets 132 which are secured to the platform 130 to support the shaft 133 on which are fixed the gears 134 and 135. The channel member 136 and the gear tooth rack 137 are secured to the slip ring 125. The angle member 138 supports the hitch and trestle locking mechanism K corresponding to previous devices, and therefore, the platform 130 supports the hitch and platform locking mechanism J.

As the trestle rails 127 are pulled in the direction of the arrow Y, the gear 135 is forced to move along the gear tooth rack 137 in the direction of the arrow Z, thereby also moving the platform 130 in the same direction. If, therefore, the platform 130 is locked to a body D and its platform locking means J are engaged therewith, it will pull the body over the trestle with it, effecting in a sense a telescopic function. The relative diameters of the gears 134 and 135 is, of course, important since this ratio will determine the movement of the body member D relative to the vehicle unloading it and the flat car T.

Operation under this application of the present invention is illustrated in Figures 35 to 38, inclusive, where the vehicle A is shown backing up on the ramp V towards the railway flat car T. The locking means J and K will engage as formerly described with reference to Figure 2 and the vehicle may proceed forward as in Figure 37. In this latter case, however, the telescopic function formerly described comes into play and as the vehicle moves forward pulling the trestle with it, the gear 134 will be rotated in a clockwise direction (see Figure 32) causing the platform F to move in the opposite direction as the trestle member extends outwardly of the flat car. Therefore, the platform F engaging the body member D by its locking means J, will draw the body member backwardly with it to accomplish double travel of the body member onto the trestle for the unit of travel of the vehicle A. All locking means operate in the manner formerly described and, therefore, the vehicle is free to move away, in Figure 38, without any difficulty.

It is only necessary in this particular unloading operation to ensure that a sufficient preponderance of the load is disposed to the other side of the nearest wheel of the flat car T in order to obtain a safe balance. This is a practical point which is not well demonstrated in the drawings, which, for purposes of clarity were drawn to illustrate function only in the unloading operations. Once the load is settled on the trestle and the body locking means L have been engaged, the trestle and its load may be swung into alignment with the flat car T as illustrated in Figure 34. Due to present dimensions of railway flat cars and transport unitary loads, it is feasible to mount three such trestle members on the car and load the same from three vehicles simultaneously, thereby effecting a great saving of time and manpower in this class of loading operation.

With the adoption of the proposed movable body, the installation cost would be low, requiring no changes in terminal construction with the possible exception of the platform construction where it would not be feasible to install a movable trestle. Substantially all of the present time delays resulting in high cost due to waste labour would be eliminated while loading operations were in progress. With the use of additional truck bodies, the loading staff could continue either breaking down the unit loads or building them up while the trucks were otherwise engaged.

The present system may be applied to all forms of city distribution where the loading operation is a factor as well as in motor transport operations in cross country delivery. Freight may be unloaded and floored on the platform within routes of delivery at the destination. Instead of loading freight on semi-trailers as at present it may be reloaded on the movable bodies as used in pick-up and delivery operations in semi-trailer construction. The present invention requires only one handling for two bodies and their loads and thus the loading staff need only be required over an eight hour period.

Although two forms of a trestle and platform device have been illustrated, it is submitted that the actual structure shown may be modified considerably without departing from the spirit of the present invention. Thus a device similar in construction to a trestle but having an extension to accommodate the necessary spare bodies may be erected within a space of eight feet in width. Such bodies acting as they do on rollers, would be readily moved on rails and interlocked one with the other as the additional bodies were added. Moreover, the trestle device is not necessarily limited in its application to the cases cited but may be erected in a modified form at airports or other locations where convenient trans-shipment with a minimum of handling and elimination of delays is required. It is, therefore, intended that the present disclosure shall not be limited in any way whatsoever except as defined by the scope of the following claims.

What we claim as our invention is:

1. The method of transferring a load from a vehicle to a trestle member slidably mounted in a platform comprising, moving the vehicle toward the platform and trestle member, holding the load fixed relative to the platform, holding the trestle member fixed relative to the vehicle, and moving the vehicle away from the platform, the load remaining stationary as the vehicle proceeds in its forward movement and the trestle member is drawn beneath the load by the vehicle.

2. The method of transferring a load from a vehicle having a body member slidably mounted thereon and supporting the load to a trestle member slidably mounted relative to a platform serving as an anchorage for the latter, comprising the steps of, moving the vehicle toward the platform and trestle member, fixing the body member relative to the platform, fixing the vehicle relative to the trestle member, causing the vehicle to move away from the platform whereby the trestle member is drawn beneath the body member and the load, and releasing the vehicle from the trestle member when the load and body member are fully supported by the trestle member.

3. The method of transferring a load from a vehicle, wherein the load rests upon a body member slidably mounted on the vehicle and fixed relative thereto and the load is fixed relative to the vehicle, to a trestle member mounted in telescopic relation to an anchorage comprising the steps of, moving the vehicle toward the anchorage and trestle member, simultaneously fixing the body member to the anchorage and the vehicle to the trestle member, releasing the load from the vehicle and the body member from the vehicle, then moving the vehicle away from the anchorage to cause the trestle member to move beneath the body member while the body member remains fixed relative to the anchorage, and releasing the vehicle member from the trestle member when the latter is in a position fully supporting the body member whereby the vehicle is free to move away after having deposited the load on the trestle member.

4. The method of transferring a load to a vehicle from a trestle member, which is slidably mounted in a platform serving as an anchorage and extending therefrom to support the load, comprising the steps of, moving the vehicle toward the load and trestle member and causing the same engage the trestle member and urge the latter toward the platform and, at the same time, cause a portion of the vehicle to support the load, the load remaining stationary relative to the platform while the trestle is being moved toward the latter, fixing the load relative to the vehicle when the same is fully supported thereby, and moving the vehicle away from the platform and trestle member.

5. The method of transferring a load, resting on a body member supported by a trestle member which is extended from telescopic relation with respect to an anchorage, to a vehicle, comprising the steps of, moving the vehicle toward the trestle member and causing the same to urge the latter into telescopic relation relative to the anchorage to allow the vehicle to replace the trestle member progressively as a support for the body member, fixing the load relative to the vehicle, and causing the vehicle to move away with the load supported thereon.

6. A load transferring system comprising a vehicle, a body member designed to be slidably received on the vehicle and to support a unit load, a receiver serving as an anchorage, a trestle member slidably mounted in said receiver, body locking means for securing said body member to said vehicle, platform locking means for locking the body member relative to the platform, and trestle locking means for locking the trestle member relative to the vehicle when the vehicle has been moved toward the platform for unloading operations, means automatically releasing the body locking means when said platform and trestle locking means are applied whereby the vehicle is free to move away from the platform to draw the trestle member beneath the body member and support the load thereon, and means for automatically releasing the trestle locking means from the vehicle when the trestle arrives at a position fully beneath the body member.

7. In a load transferring system including a vehicle, a receiver designed to serve as an anchorage, a trestle member slidably mounted relative to the latter, a body member designed for slidable reception on said trestle member to support a load in unitary form, the vehicle being movable toward the trestle member to urge the latter into telescopic relation relative to said receiver and to replace the receiver in supporting said body member and said load, and locking means for locking the body member relative to the vehicle when the latter is fully supporting the body member and the load.

ALEXANDER DOBBIE McGREGOR.
JOHN LOWERY GROPP.

REFERENCES CITED

The following references are of record in the file of this patent:

UNITED STATES PATENTS

| Number | Name | Date |
|---|---|---|
| 1,915,883 | Fager | June 27, 1933 |
| 2,010,969 | Soulis | Aug. 13, 1935 |
| 2,102,844 | Hester | Dec. 21, 1937 |
| 2,107,569 | Hamlin | Feb. 8, 1938 |